United States Patent
Leiby et al.

(10) Patent No.: US 7,653,117 B2
(45) Date of Patent: Jan. 26, 2010

(54) METHOD FOR DECODING DIGITAL DATA IN A FREQUENCY HOPPING COMMUNICATION SYSTEM

(75) Inventors: Edwin Leiby, Avon, NY (US); Mark Walter Chamberlain, Honeoye Falls, NY (US); Joseph Shaver, Rochester, NY (US); Paul Voglewede, N. Chili, NY (US)

(73) Assignee: Harris Corporation, Melbourne, FL (US)

( * ) Notice: Subject to any disclaimer, the term of this patent is extended or adjusted under 35 U.S.C. 154(b) by 594 days.

(21) Appl. No.: 11/377,491

(22) Filed: Mar. 16, 2006

(65) Prior Publication Data

US 2007/0217484 A1 Sep. 20, 2007

(51) Int. Cl.
*H04B 1/00* (2006.01)
(52) U.S. Cl. .................................................. 375/132
(58) Field of Classification Search ................ 375/132
See application file for complete search history.

(56) References Cited

U.S. PATENT DOCUMENTS

| 5,452,319 | A | 9/1995 | Cook et al. |
| 2005/0207474 | A1* | 9/2005 | Voglewede .............. 375/132 |
| 2007/0032241 | A1 | 2/2007 | Busch et al. |

* cited by examiner

*Primary Examiner*—David C Payne
*Assistant Examiner*—Nader Bolourchi
(74) *Attorney, Agent, or Firm*—Harness, Dickey & Pierce, PLC

(57) ABSTRACT

An improved method is provided for decoding data in a frequency hopping communications system. The method includes: monitoring transition points between data bits in a demodulated data stream, where the data bits are transmitted to a receiver over different transmission frequencies; determining a frequency over which data bits are transmitted to the receiver; determining a reliability metric for each frequency over which data bits were received, where the reliability metric is based on transition points of data bits transmitted over a given frequency; and performing a decoding operation using the reliability metric for each frequency over which data bits were received.

13 Claims, 4 Drawing Sheets

METHOD FOR DECODING DIGITAL DATA IN A FREQUENCY HOPPING COMMUNICATION SYSTEM

FIELD

The present disclosure relates generally to frequency hopping communication systems and, more particularly, to an improved method for decoding frequency hopped digital data using a forward error correcting scheme with erasure decoding capabilities.

BACKGROUND

In a frequency hopped waveform, it is possible to achieve modem acquisition in very high bit rate error conditions. In a jamming environment specifically, a modem can acquire with an on air bit error rate sometimes greater than 25-30%. However, it is important in this environment to provide a method of robust error correction in order to reliably decode a data stream at the receiver.

Forward error correction (FEC) is a method of controlling the received error rate of a user-provided data stream that is transmitted over a noisy channel. A forward error correction scheme will in general accomplish this by the generation and transmission of extra data along with the user data stream. This extra data provides the receiver with a more efficient way of determining what was actually transmitted across the channel. The performance of some forward error correcting schemes can be enhanced by indicating to the decoder which portions of a receive data stream are likely to be in error. The indicated portions are referred to as erasures. A forward error correction scheme that can make use of this information is referred to as having erasure decoding capabilities.

Accordingly, it is desirable to provide a method for decoding digital data using a forward error correcting scheme with erasure decoding capabilities in the context of a frequency hopping communication system. The statements in this section merely provide background information related to the present disclosure and may not constitute prior art.

SUMMARY

An improved method is provided for decoding data in a frequency hopping communications system. The method includes: monitoring transition points between data bits in a demodulated data stream, where the data bits are transmitted to a receiver over different transmission frequencies; determining a reliability metric for each frequency over which data bits were transmitted, where the reliability metric is based on transition points of data bits transmitted over a given frequency; and performing a decoding operation using the reliability metric for each frequency over which data bits were transmitted to the receiver.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Frequency hopping is a method of transmitting radio signals by rapidly transmitting a carrier among many frequency channels. Briefly, a transmitter "hops" between available frequencies according to a specified algorithm. The transmitter operates in synchronization with a receiver, which remains tuned to the same frequency as the transmitter. A short burst of data is transmitted on a particular carrier frequency. The transmitter then tunes to another frequency and transmits again. Thus, the receiver is capable of hopping its frequency several times a second to follow the transmission frequency employed by the transmitter.

Figure 1:
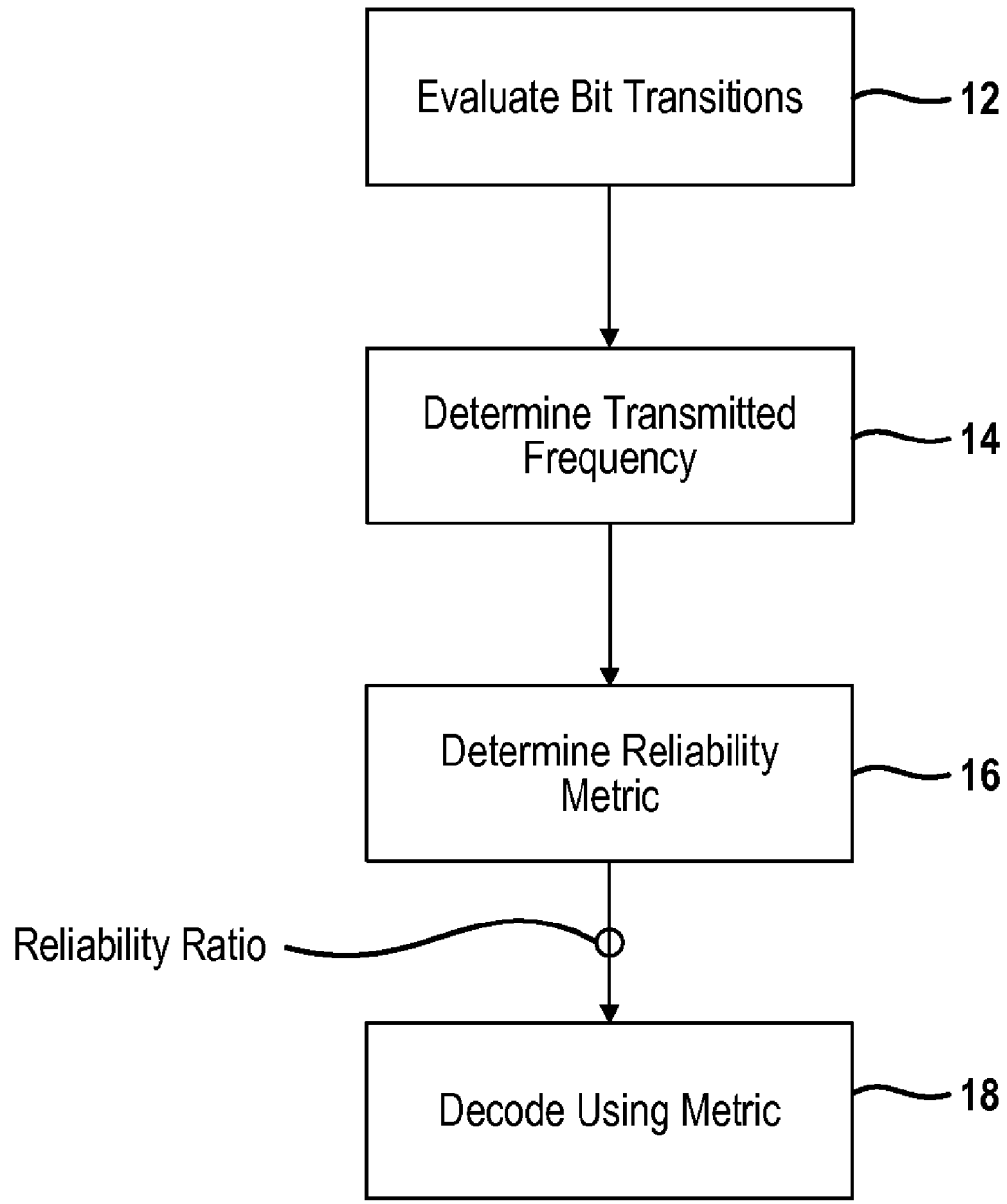
FIG. 1 is a flowchart depicting an improved method for improved method is provided for decoding data in a frequency hopping communications system.

FIG. 1 depicts an improved method 10 for decoding digital data transmitted in a frequency hopping communication system. The communication system is assumed to employ a forward error correcting scheme with erasure capabilities. While the decoding methods of this disclosure are described in the context of a frequency hopping communication system, they have application to other types of radio communication systems which transmit signals over multiple frequencies.

First, the reliability of data bits received at a receiver is evaluated at 12 based on transition points between the data bits. A baseband sample stream must be sampled correctly with respect to its data bit transitions in order to have its modulated data correctly recovered. Thus, receiver's demodulator is aligned with the data bit transitions of the stream in a manner known in the art.

Figure 2:
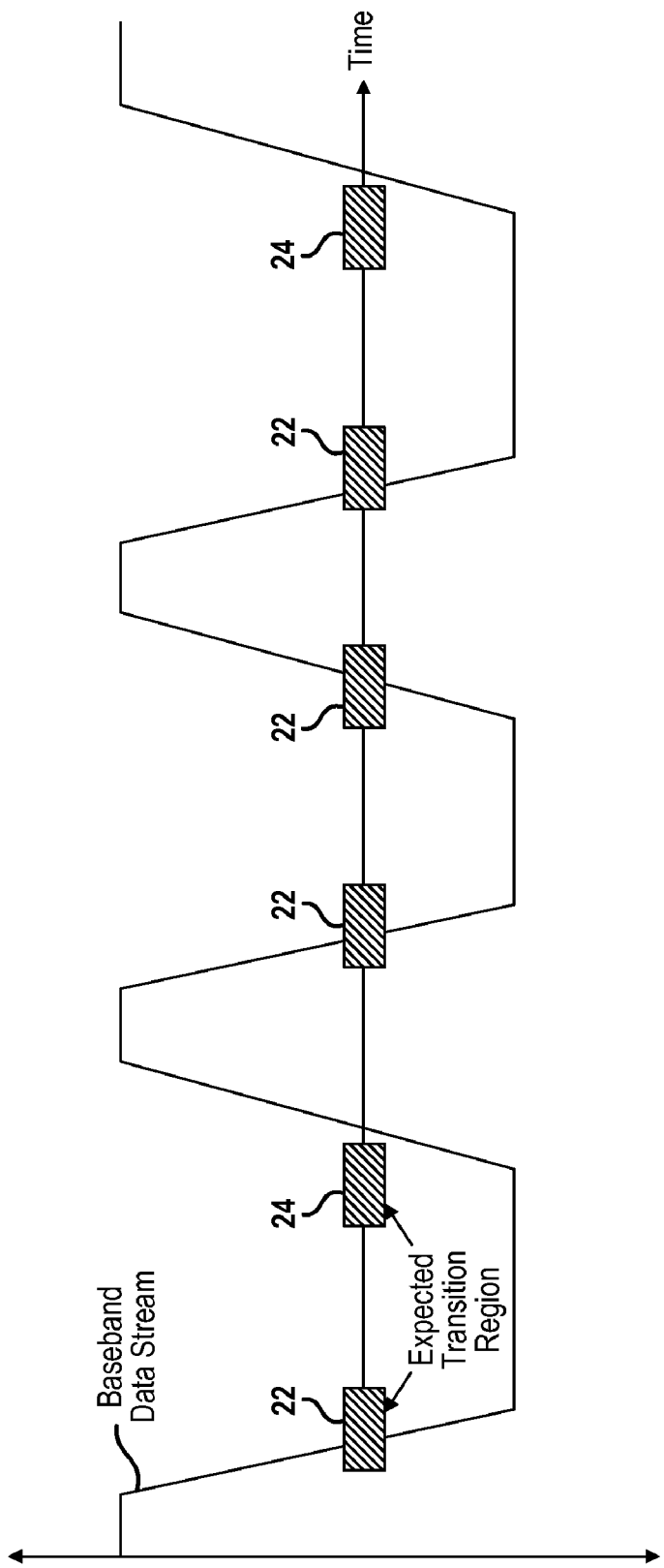
FIG. 2 is a diagram illustrating how data bit transitions can provide an indication as to the reliability of the frequency over which the data bit was transmitted.

For a baseband sample stream, the transition points occur as sign changes and are commonly referred to as zero crossings. Given the known bit rate for the sample stream, an expected transition point can be derived for each data bit in the sampled stream. These data bit transitions are then monitored and assessed to determine whether they occur within an expected transition region as shown in FIG. 2. Data bits falling within the expected transition region as indicated at 22 have experienced considerably less noise than data bits falling out side of the expected transition region as indicated as 24. Thus, data bit transitions can provide an indication as to the reliability of the frequency over which the data bit was transmitted to the receiver.

Based on data bit transitions, reliability metrics may be determined at 16 for each frequency over which data bits were received at the receiver. In an exemplary embodiment, the reliability metric is derived from a comparison between the number of transition points which fall within the expected transition region and the total number of transition points seen. In other words, the reliability metric is defined as a ratio of the number of zero crossing that occur in the expected transition region to the total number of zero crossings that occur both inside and outside of the expected transition region. Other reliability metrics based on data bit transitions are also contemplated by this disclosure. Likewise, reliability metrics may be derived from other signal parameters. For example, a reliability metric may be based on a ratio of any variation in the RF signal envelope to a mean value for the RF signal envelope In order to tune an applicable frequency, the demodulator in a frequency hopped system knows the hopping sequence. Accordingly, the demodulator knows the frequency over which each data bit was transmitted to the receiver. For each hops' worth of data, a reliability ratio is computed from the data bits that were transmitted over the given frequency. Alternatively, the reliability ratio may be computed from data bits transmitted over a given frequency but sent over multiple hops.

For illustration purposes, a simple example is further described below. Assume five codewords each comprised of five bits are transmitted over five different frequencies to the receiver. These codewords are noted as follows:

$CW_1 = b_{11}b_{12}b_{13}b_{14}b_{15}$
$CW_2 = b_{21}b_{22}b_{23}b_{24}b_{25}$
$CW_3 = b_{31}b_{32}b_{33}b_{34}b_{35}$
$CW_4 = b_{41}b_{42}b_{43}b_{44}b_{45}$
$CW_5 = b_{51}b_{52}b_{53}b_{54}b_{55}$

Prior to being transmitted, these codewords may be interleaved such that the first bit of each codeword is assigned to a first interleaved sequence, the second bit of each codeword is assigned to a second interleaved sequence, and so on. The resulting interleaved sequences are as follows:

$IL1 = b_{11}b_{21}b_{31}b_{41}b_{51}$
$IL2 = b_{12}b_{22}b_{32}b_{42}b_{52}$
$IL3 = b_{13}b_{23}b_{33}b_{43}b_{53}$
$IL4 = b_{14}b_{24}b_{34}b_{44}b_{54}$
$IL5 = b_{15}b_{25}b_{35}b_{45}b_{55}$

The interleaved sequences are then assigned a frequency for transmission.

Upon receipt of each bit sequence at the receiver, a reliability ratio may be computed from the bits contained in the sequence. For instance, if three of the bits in the first interleaved sequence fell within the expected transition regions, and two of the bits fell outside of the expected transition region, the reliability ratio for the assigned frequency is computed as 3/5 =0.6. In the second interleaved sequence, perhaps only a single bit fell outside of the expected transition region. In this case, the reliability ratio for this assigned frequency is computed as 4/5 =0.8. A reliability ratio for each frequency may be computed in a similar manner.

On a high signal to noise (i.e., low noise) frequency channel, this ratio will be close to unity. As the noise level increases, the ratio will also decease accordingly as more and more bit transitions occur outside the expected region. Thus, this ratio provides an indication as to the reliability of the frequency. In an exemplary embodiment, this ratio may be compared to an empirically derived threshold value. When the ratio for a given frequency greater than or equal to the threshold, the frequency is classified as reliable. When the ratio for the given frequency is lower than the threshold, the frequency is classified as unreliable. Alternatively, the ratio may be compared to multiple thresholds to determine different degrees of reliability. This reliability information is subsequently used when performing an decoding operation as indicated at 18. It is readily understood that the threshold may be set and adjusted based on system performance objectives.

Figure 3:
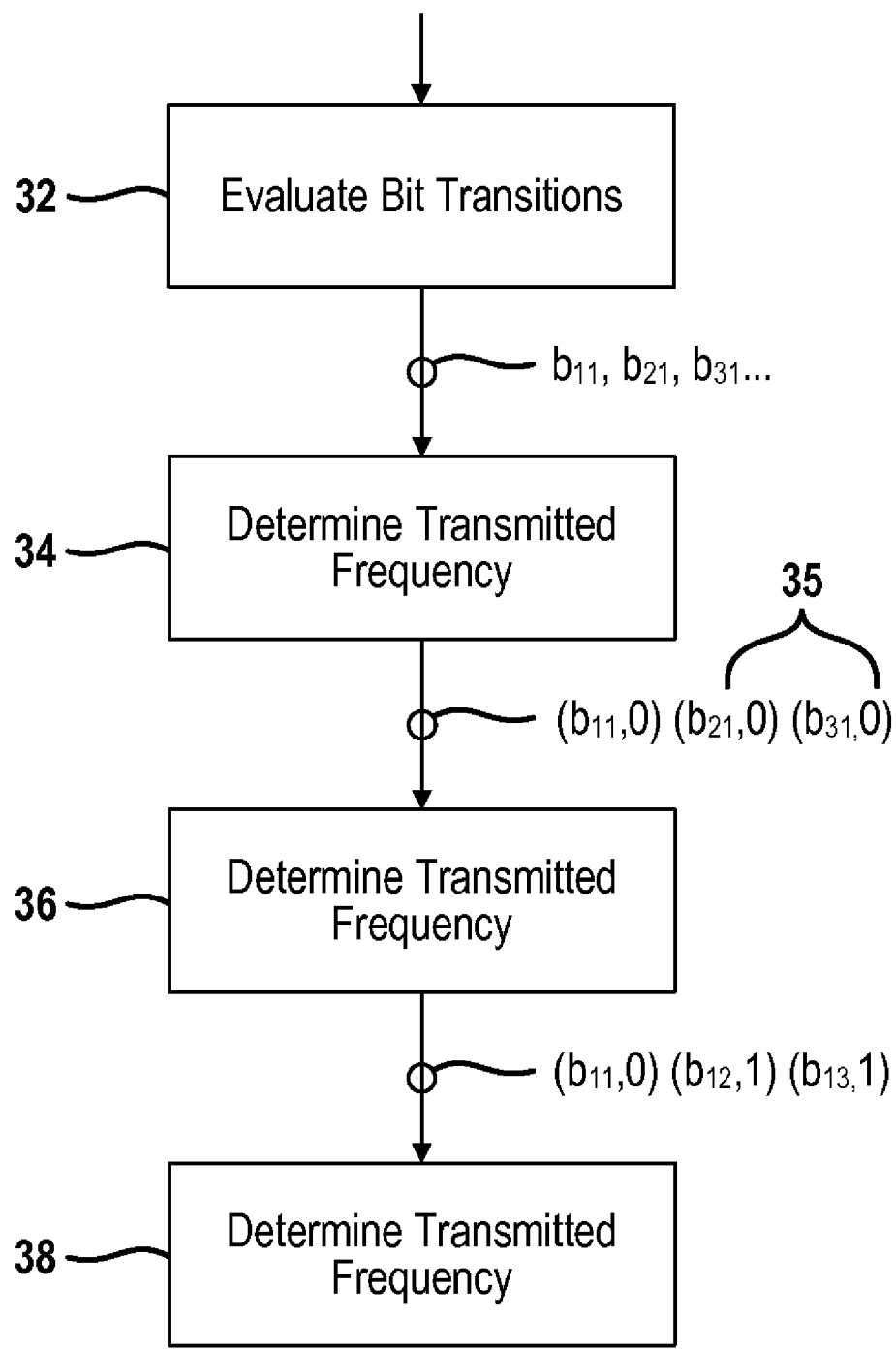
FIG. 3 is a block diagram illustrating how the improved decoding method may be integrated into a radio's receiver architecture.

FIG. 3 further illustrates how this decoding method may be integrated into a radio's receiver architecture. In this exemplary embodiment, the radio receiver is generally comprised of a demodulator 32, a de-interleaver 36, and a decoder 38. While operation of these basic components is further described below, it is understood that other known radio receiver components may be needed for overall operation of the system.

In operation, a received data signal is first input to the demodulator 32 which in turn demodulates the signal in a manner known in the art. The signal output from the demodulator 32 is commonly referred to as the baseband sample stream.

The baseband sample stream is then input to a reliability metric generator 34. The reliability metric generator 34 is operable to determine reliability information for each frequency over which data bits were transmitted to the receiver. More specifically, the reliability metric generator 34 computes a reliability ratio for each frequency and compares the ratio to a threshold in the manner described above. This reliability information is then associated with each data bit in the baseband sample stream. In an exemplary embodiment, a binary indicator bit is associated with each data bit. When a given frequency is deemed reliable, the reliability indicator is set to one; whereas, when the given frequency is deemed unreliable, the reliability indicator is set to zero. In an alternative embodiment, the reliability indicator may be comprised of two or more bits to represent different degrees of reliability information. This reliability indicator is commonly referred to as an erasure.

Continuing with the example described above, the baseband sample stream may be comprised of the interleaved sequences IL1+IL2+IL3+IL4+IL5, where the each sequence was transmitted over a different frequency. Given a threshold of 0.7, the frequency assigned to the first interleaved sequence is deemed unreliable (i.e., 0.6<0.7). In this case, a reliability indicator bit of zero is associated with each bit in the sequence, such that the bit stream output by the reliability metric generator is as follows: $(b_{11},0)$, $(b_{21},0)$, $(b_{31},0)$, $(b_{41},0)$, $(b_{51},0)$. In contrast, the frequency assigned to the second interleaved sequence is deemed reliable (i.e., 0.83>0.7). A reliability indicator bit of one is associated with each bit in the sequence as follows: $(b_{12},1)$, $(b_{22},1)$, $(b_{32},1)$, $(b_{42},1)$, $(b_{52},1)$. Thus, the data bits of the baseband sample stream are reformulated into bit pairs.

Next, the reformulated bit pairs are input to the de-interleaver 36. The de-interleaver 36 is adapted to account for the additional reliability bit associated with each incoming data bit, but otherwise operates in the manner known in the art to re-order the bit pairs into a sequence of codewords. In the ongoing example, the re-ordered bit pairs appear as: $(b_{11},0)$, $(b_{12},1)$, $(b_{13},1)$. . . .

Lastly, the stream of re-ordered bit pairs is input into a decoder which employs a forward error correcting scheme with erasure capabilities. In the case of a majority logic decoder, the method of applying the reliability indicator is easily understood. For each codeword, the decoder determines the number of bits having a value of one and the number of bits having a value of zero. Bits indicated as being transmitted over an unreliable frequency are ignored. If there are more ones than zeroes in a given codeword, the decoder outputs a value of one for the codeword. If there are more zeroes than ones in the codeword, the decoder outputs a value of zero for the codeword. For a tie, the decoder may make an arbitrary decision. Within the scope of this disclosure, it is readily understood that the re-ordered bit pairs may be input to decoder which employ other decoding schemes (e.g., Reed-Solomon forward error correction scheme with erasure capabilities). In this way, the decoding accuracy of the data is improved in a frequency hopped communication system.

Figure 4:
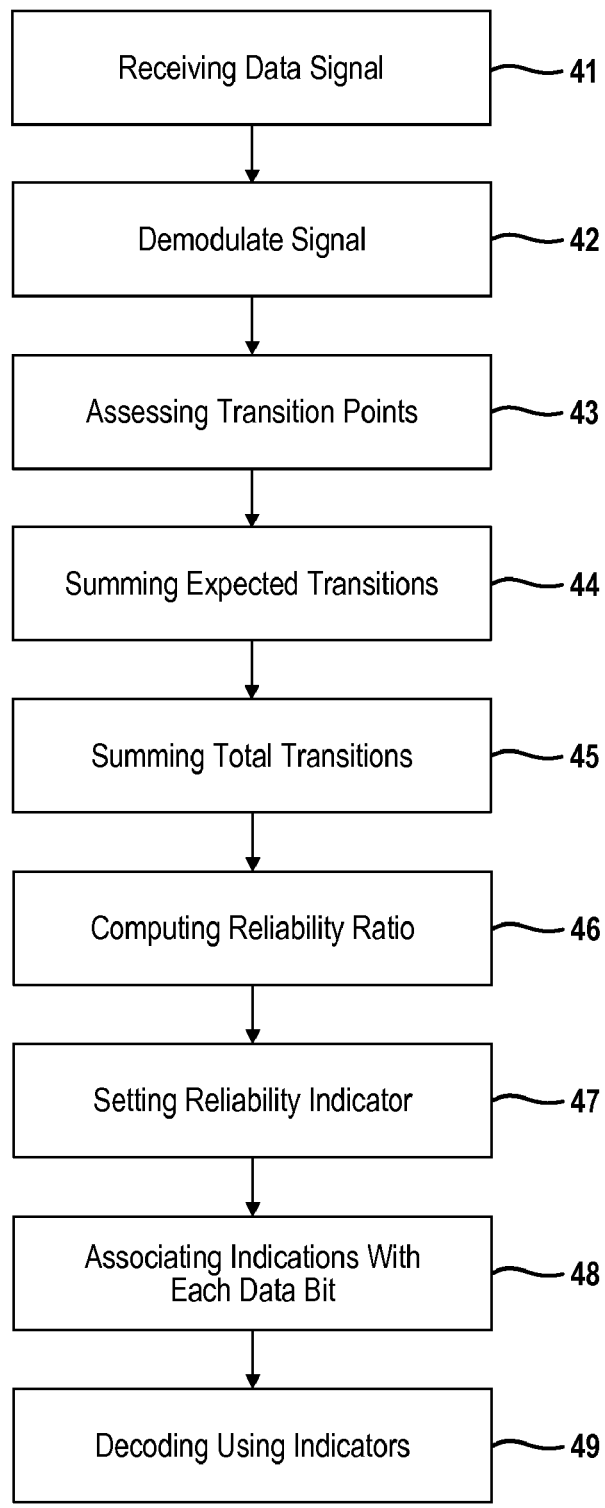
FIG. 4 is a flowchart further illustrating the improved decoding method.

The improved decoding method described above is illustrated further in FIG. 4. This improved method is particularly suited for military applications such as the Single Channel Ground-Airborne Radio System (SINOGARS). Further details regarding this radio system may be found in U.S. Pat.

Nos. 6,018,543; 6,052,406; and 6,078,612 which are incorporated herein by reference. Nonetheless, the above description is merely exemplary in nature and is not intended to limit the present disclosure, application, or uses.

What is claimed is:

1. An improved method for decoding data in a frequency hopping communications system, comprising:
   receiving an incoming radio signal by a radio and demodulating the incoming radio signal to form a demodulated data stream;
   monitoring transition points between data bits in the demodulated data stream, where the data bits are transmitted to a receiver over different transmission frequencies;
   determining a reliability metric for each frequency over which data bits were transmitted by assessing whether the bit transitions are within an expected transition region as derived from a known bit rate of the data stream,
   computing a ratio between a number of bit transitions which fall inside of the expected transition region and a total number of bit transition which fall both inside and outside the expected transition region;
   classifying a given frequency over which data bits were received as reliable when the ratio for the given frequency is greater than or equal to a predefined threshold;
   classifying a given frequency over which data bits were received as unreliable when the ratio for the given frequency is less than the predefined threshold; and
   performing a decoding operation using the reliability metric for each frequency over which data bits were transmitted.

2. The method of claim 1 wherein determining a reliability metric further comprises assessing transition points of data bits transmitted during a single hop on a given frequency.

3. The method of claim 1 further comprises associating a reliability metric with each data bit in the data stream, where the reliability metric for a given data bit is based on the frequency over which the data bit was transmitted to the receiver.

4. The method of claim 1 wherein the reliability metric is further defined as a binary indicator which is set to one when the frequency is deemed reliable and set to zero when the frequency is deemed unreliable.

5. An improved method for decoding data in a frequency hopping communications system, comprising:
   receiving a bit stream that was transmitted over a given frequency at a radio;
   determining whether transitions between data bits in the bit stream fall within an expected transition region;
   summing a number of bit transitions in the bit stream which fall within the expected transition region;
   summing a total number of bit transitions in the bit stream;
   computing a ratio between the number of bit transitions which fall within the expected transition region and the total number of bit transitions in the bit stream;
   setting a reliability indicator for the given frequency to one when the ratio for the given frequency is greater than or equal to a predefined threshold; and
   setting the reliability indicator for the given frequency to zero when the ratio for the given frequency is less than the predefined threshold.

6. The method of claim 5 further comprises forming a bit pair for each data bit in the bit stream, where each bit pair includes a data bit and the reliability indicator.

7. The method of claim 5 further comprises repeating the steps for each bit stream transmitted over a different frequency.

8. The method of claim 5 further comprises decoding the bit stream based in part on the reliability indicator.

9. The method of claim 8 further comprises de-interleaving the bit stream prior to decoding the bit stream.

10. The method of claim 8 further comprises decoding of the bit stream using a majority logic scheme.

11. The method of claim 1 further comprises decoding the bit stream using a Reed-Solomon forward error correction scheme.

12. A receiver in a frequency hopping communication system, comprising:
   a demodulator adapted to receive an incoming data signal and operable to demodulate the data signal to form a baseband data stream;
   a reliability metric generator adapted to receive the baseband data stream from the demodulator and operable to compute a reliability indicator for each frequency over which data bits in the baseband data stream were received, the reliability metric generator further operable to output a bit stream having a reliability indicator associate with each data bit based on the frequency over which the data bit was transmitted to the receiver, where the reliability metric generator computes the reliability indicator by assessing whether bit transitions transmitted over a given frequency are within an expected transition region, computing a ratio between a number of bit transitions which fall inside the expected transition region and a total number of bit transitions falling both inside and outside of the expected transition regions and classifying the given frequency as reliable when the ratio for the given frequency is greater than a predefined threshold; and
   a decoder adapted to receive the bit stream from the reliability metric generator and operable to decode the bit stream based in part on the reliability indicator associated with each data bit.

13. The receiver of claim 12 further comprises a de-interleaver adapted to receive the bit stream from the reliability metric generator and operable to pass through the reliability indicator associated with each data bit to the decoder.

* * * * *

UNITED STATES PATENT AND TRADEMARK OFFICE
CERTIFICATE OF CORRECTION

PATENT NO. : 7,653,117 B2  Page 1 of 1
APPLICATION NO. : 11/377491
DATED : January 26, 2010
INVENTOR(S) : Leiby et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 910 days.

Signed and Sealed this

Twenty-third Day of November, 2010

David J. Kappos
*Director of the United States Patent and Trademark Office*